US007831349B2

(12) United States Patent
Jeong (10) Patent No.: US 7,831,349 B2
(45) Date of Patent: Nov. 9, 2010

(54) APPARATUS AND METHOD FOR CONTROLLING DISPLAY LUMINOSITY ACCORDING TO AN OPERATIONAL MODE IN A NAVIGATION SYSTEM

(75) Inventor: Gyu Hyun Jeong, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1216 days.

(21) Appl. No.: 11/109,809

(22) Filed: Apr. 20, 2005

(65) Prior Publication Data

US 2006/0085121 A1   Apr. 20, 2006

(30) Foreign Application Priority Data

Oct. 15, 2004   (KR)   ...................... 10-2004-0082472

(51) Int. Cl.
   *G01C 21/26*   (2006.01)
(52) U.S. Cl. .......................... 701/36; 701/200; 348/687; 348/673; 345/77
(58) Field of Classification Search ................. 701/200, 701/36; 315/308; 345/102, 204, 211, 30, 345/77; 348/673, 687
   See application file for complete search history.

(56) References Cited

U.S. PATENT DOCUMENTS

| 5,576,732 A  | * | 11/1996 | Minakuchi et al. ........... 345/667 |
| 6,069,418 A  | * | 5/2000  | Tanaka ..................... 310/12.25 |
| 6,396,217 B1 | * | 5/2002  | Weindorf ................. 315/169.1 |
| 6,507,286 B2 | * | 1/2003  | Weindorf et al. ........ 340/815.75 |
| 6,563,479 B2 | * | 5/2003  | Weindorf et al. .............. 345/77 |
| 6,658,344 B2 | * | 12/2003 | Hirasago ..................... 701/96 |
| 6,762,741 B2 | * | 7/2004  | Weindorf .................... 345/102 |
| 6,947,035 B1 | * | 9/2005  | Shiraga ...................... 345/211 |
| 7,092,007 B2 | * | 8/2006  | Eguchi et al. .............. 348/148 |
| 7,183,727 B2 | * | 2/2007  | Ferguson et al. ............ 315/308 |
| 7,265,661 B2 | * | 9/2007  | Satou ........................ 340/461 |
| 2001/0013854 A1 |   | 8/2001  | Ogoro |
| 2002/0024529 A1 | * | 2/2002  | Miller et al. ................. 345/690 |
| 2002/0101166 A1 | * | 8/2002  | Weindorf et al. .............. 315/82 |
| 2002/0113808 A1 | * | 8/2002  | Weindorf et al. ............ 345/699 |

(Continued)

FOREIGN PATENT DOCUMENTS

EP   0 824 253   2/1998

(Continued)

*Primary Examiner*—Thomas G Black
*Assistant Examiner*—Wae Louie
(74) *Attorney, Agent, or Firm*—Ked & Associates LLP (57) ABSTRACT

An apparatus and method of controlling display luminosity in an operational mode in a navigation system is provided. The method includes determining a current operational mode from a plurality of operational modes of a navigation system, and automatically adjusting a display luminosity based on the determined current operational mode. The apparatus includes a key input unit configured to receive a signal of an operational mode selected by a user, a memory configured to store predetermined display luminosity levels corresponding to a plurality of operational modes and/or states of a subject, a central processing unit configured to receive the signal from the key input unit of the operational mode selected by a user and read display luminosity levels from the memory corresponding to the selected operational mode, and a display control unit configured to a receive a control signal from the central processing unit and to control a backlight control value of a display unit to control display luminosity in accordance with the selected operational mode.

52 Claims, 8 Drawing Sheets

U.S. PATENT DOCUMENTS

| | | | |
|---|---|---|---|
| 2002/0118182 A1* | 8/2002 | Weindorf | 345/204 |
| 2002/0133285 A1* | 9/2002 | Hirasago | 701/96 |
| 2004/0212686 A1* | 10/2004 | Usami | 348/208.99 |
| 2005/0057162 A1* | 3/2005 | Kover et al. | 315/77 |
| 2005/0065664 A1* | 3/2005 | Tsuruhara et al. | 701/1 |
| 2005/0212824 A1* | 9/2005 | Marcinkiewicz et al. | 345/690 |
| 2006/0085121 A1* | 4/2006 | Jeong | 701/200 |
| 2006/0274213 A1* | 12/2006 | Saier et al. | 348/673 |
| 2007/0124041 A1* | 5/2007 | Kwon et al. | 701/35 |
| 2007/0146235 A1* | 6/2007 | Nolan et al. | 345/7 |
| 2007/0183163 A1* | 8/2007 | Daniel | 362/489 |
| 2007/0236411 A1* | 10/2007 | Kurosaki et al. | 345/30 |
| 2008/0300731 A1* | 12/2008 | Nakajima et al. | 701/1 |

FOREIGN PATENT DOCUMENTS

| | | |
|---|---|---|
| EP | 0 918 310 | 5/1999 |
| JP | 06-206470 | 7/1994 |
| JP | 09-007095 | 1/1997 |
| JP | 10-257406 | 9/1998 |

* cited by examiner

| Operational mode | TV,DVD | CD,Tape | Tuner | Navigation |
|---|---|---|---|---|
| Display luminosity | Strong | weak | weak | middle |

FIG.5

| Traveling speed | Stop | Below 30km/h | Above 30km/h |
|---|---|---|---|
| Display luminosity | Strong | weak | Turn-off screen |

APPARATUS AND METHOD FOR CONTROLLING DISPLAY LUMINOSITY ACCORDING TO AN OPERATIONAL MODE IN A NAVIGATION SYSTEM

BACKGROUND OF THE INVENTION

1. Field of the Invention

The invention relates to a navigation system, and more particularly, to an apparatus and method for controlling display luminosity according to an operational mode in a navigation system.

2. Background of the Related Art

Generally, a navigation system indicates a computed current position of a moving subject on a map displayed on a screen using information received from a global positioning system (hereinafter, "GPS"). The navigation system provides a user with various kinds of information, for example, information necessary for traveling in a particular direction for a moving subject, a distance to a destination, a current traveling speed of the moving subject, a path set up by a user prior to traveling, and an optimal path to the destination.

Navigation systems are currently loaded on various moving subjects, such as ships, planes, and vehicles, to be globally used in confirming a current position or location and a traveling speed of the moving subject and/or deciding a traveling path. Specifically, the navigation system receives radio waves indicating, for example, longitude, latitude, and altitude from a plurality of satellites belonging to GPS, computes a current location of a moving subject, and then informs a driver of map information, including, for example, the current location visually and/or audibly. The navigation system is also provided with supplementary functions, such as a dimming function for adjusting screen luminosity of a display to fit peripheral illumination in order not to attract the attention of a driver who is driving.

Figure 1:
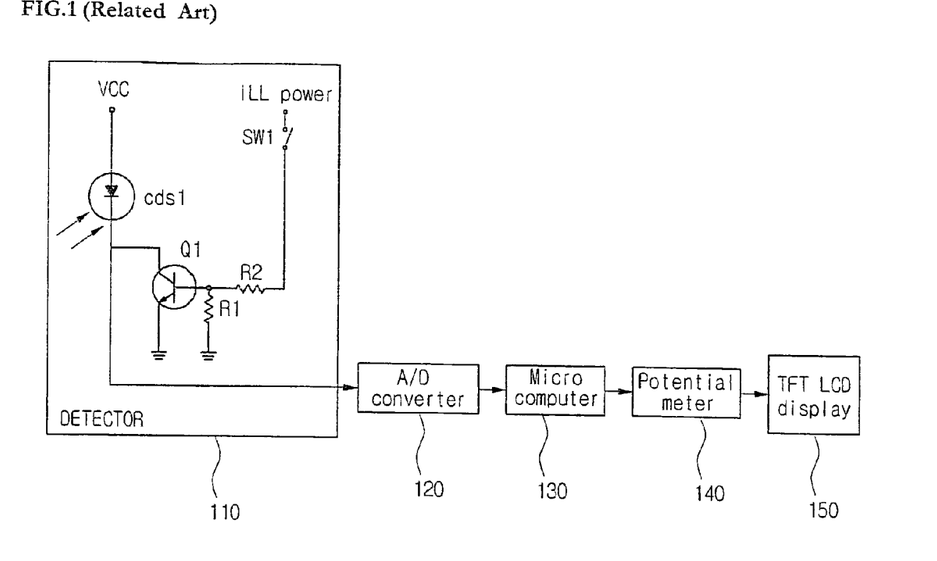
FIG. 1 is a block diagram of a related art auto dimming device in a car A/V system.

FIG. 1 is a block diagram of a related art auto dimming device in a car A/V system disclosed in Korean Patent Application No. 10-1998-0034368. Referring to FIG. 1, the related art auto dimming device in a car A/V system includes a detector 110 that detects peripheral luminosity, an A/D converter 120 that divides a voltage of a detected analog voltage value into prescribed grades to convert it to a digital value, a microcomputer 130 that outputs an output from the A/D converter 120 as a potential meter grade value in prescribed grades, a potential meter 140 that outputs an analog voltage value in prescribed grades from an output of the microcomputer 130, and a TFT LCD 150 that displays a level varying according to the voltage value from the potential meter 140.

The detector 110 includes a photoconductive cell cds1 that detects the peripheral luminosity, a switch SW1 that switches on/off illumination power ILL power, load resistors R1 and R2 connected to the switch SW1, and a transistor Q1 connected between the load resistors R1 and R2. The photoconductive cell cds1 outputs a voltage difference according to a variation of resistance due to a peripheral light change.

An operation of the above-described device will be explained with reference to FIG. 1 as follows.

First, once power is applied to an illumination terminal, such as a car tail lamp power on/off switch of the illumination power ILLpower, an auto dimming function signal is released. Namely, if the power is applied from the illumination terminal, the switch SW1 is turned on so that a voltage is applied to the transistor Q1 via the resistors R1 and R2. Since a collector potential of the transistor Q1 stays at a low level, a potential difference of the photoconductive cell cds1 of the detector 110 is grounded to be 0V. Hence, the auto dimming function is forcibly released to perform prescribed illumination only. Yet, as a voltage value is transferred from the photoconductive cell cds1 in an off-mode of the switch SW1, the auto dimming function is established.

A variation level of the voltage value of the photoconductive cell cds1 ranges 0V to 5V, whereby a voltage level is output differently according to external luminosity, the presence of sunlight, a fluorescent lamp, or a glow lamp. Hence, it is able to provide an output voltage variable according to external luminosity.

Once the photoconductive cell cds1 detects external luminosity, the detected analog voltage is input to the A/D converter 120 so that the analog value can be converted to the digital value to be input to the microcomputer 130. The A/D converter 120 divides the variation level into seventeen grades. Namely, the luminosity of the LCD display 150 is divided into various grades for illumination.

Subsequently, the microcomputer 130 outputs data to the potential meter 140 provided at its rear end according to the seventeen grades of the A/D converter 120 to fit a resistance grade of the potential meter 140. The output data corresponding to the grade value of the potential meter 140 from the microcomputer 130 is then input to the potential meter 140 to be output as a DC analog voltage value corresponding to the data value. And, an output of the potential meter 140 is output to the TFT LCD display 150 to implement auto dimming of the car A/V system to correspond to the peripheral luminosity.

The related art auto dimming device, which discerns daytime luminosity, nighttime luminosity, and external luminosity from each other, relatively raises the illumination of the LCD display 150 and backlight thereof due to the influence of the external light in daytime, thereby enhancing a user's visibility. However, as the navigation system needs various functions to comply with the tendency toward digital convergence, the related art auto dimming device fails in controlling the LCD luminosity adaptively.

Thus, the related art navigation system fails to be provided with the appropriate LCD dimming function but indiscriminately controls the illumination of the LCD so that there exists no difference in luminosity between a video mode, such as a TV mode and an audio-only mode, thereby wasting power consumption and interfering with the attention of a user who is driving due to the LCD image.

SUMMARY OF THE INVENTION

An object of the invention is to solve at least the above problems and/or disadvantages and to provide at least the advantages described hereinafter.

To achieve at least the above objects, in whole or in part, and in accordance with the purposes of the invention, as embodied and broadly described herein, there is provided a method of controlling display luminosity according to an operational mode in a navigation system according to an embodiment of the invention that includes determining a current operational mode from a plurality of operational modes of a navigation system, and automatically adjusting a display luminosity based on the determined current operational mode.

To further achieve at least the above objects, in whole or in part, and in accordance with the purposes of the invention, as embodied and broadly described herein, there is provided a method of controlling display luminosity according to an operational mode in a navigation system according to an embodiment of the invention that includes checking whether a moving subject is in a traveling state or a stop state, if a specific function button is selected while the moving subject is in the stop state, controlling a display luminosity according to an operational mode of the selected function button, and if a communication mode is initiated in the operation mode of the specific function button, switching the operational mode to the communication mode after cutting off an audio output of a video or audio mode.

To further achieve at least the above objects, in whole or in part, and in accordance with the purposes of the invention, as embodied and broadly described herein, there is provided a method of controlling display luminosity according to an operational mode in a navigation system according to an embodiment of the invention that includes setting up a priority in each of a traveling and stop state of a subject for a plurality of operational modes of the system, setting up a display luminosity level for an operational mode switched according the traveling or stop state of the system, detecting a traveling speed of a subject, and if the subject is in the traveling state or a stop state, operating the operational mode corresponding to the setup priority only and adjusting display luminosity to the display luminosity level of the corresponding operational mode.

To further achieve at least the above objects, in whole or in part, and in accordance with the purposes of the invention, as embodied and broadly described herein, there is provided an apparatus for controlling display luminosity according to an operational mode in a navigation system according to an embodiment of the invention that includes a key input unit configured to receive a signal of an operational mode selected by a user, a memory configured to store predetermined display luminosity levels corresponding to a plurality of operational modes and/or states of a subject, a central processing unit configured to receive the signal from the key input unit of the operational mode selected by a user and read display luminosity levels from the memory corresponding to the selected operational mode, and a display control unit configured to receive a control signal from the central processing unit and to control a backlight control value of a display unit to control display luminosity in accordance with the selected operational mode.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Now, an apparatus and method for controlling display luminosity according to an operational mode in a navigational system in accordance with embodiments of the invention will be discussed in detail with reference to the drawings, in which like references numbers designate like elements.

Figure 2:
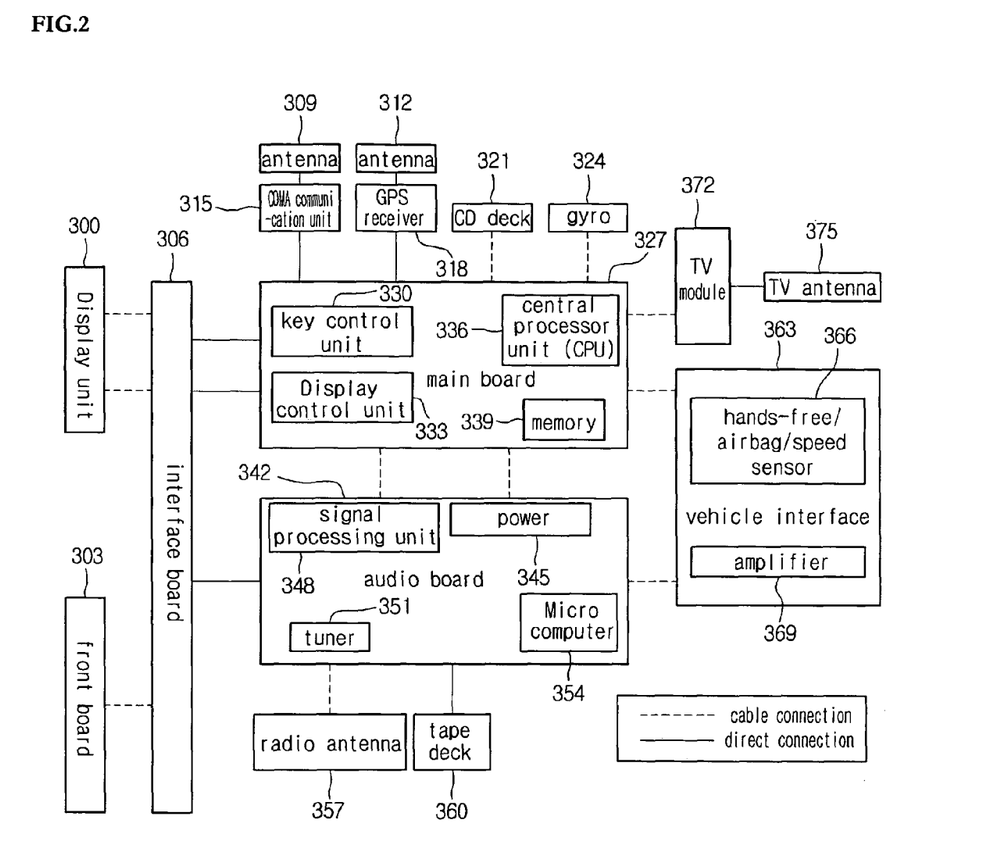
FIG. 2 is a block diagram of a navigation system according to an embodiment of the invention.

FIG. 2 is a block diagram of a navigation system according to an embodiment of the invention. Referring to FIG. 2, a navigation system according to an embodiment of the invention may include an interface board 306, a main board 327, an audio board 342 for processing audio signals, and a vehicle interface 363.

The interface board 306 may interface data between separate boards and play a role in receiving/transferring signals of the main and audio boards 327 and 342 between a display unit 300, for example, an LCD display unit, and a front board 303. The main board 327 may include a central processor unit (CPU) 336 that controls the system, a memory 339 that stores map information for displaying traffic situation information of a current road for traveling and a traveling path guide on a map, a key control unit 330 that controls a key signal, and an display control unit 333 that controls the display unit. For implementation of embodiments of the invention, the memory 339 stores control information for illumination per operational mode, display illumination per traveling state, and/or priority per mode of the system therein.

The main board 327 may be cabled or directly connected to a mobile communication unit 315, such as a CDMA communication terminal, provided with a unique device number, a GPS receiver 218 that receives GPS signals, a CD deck 321 that reproduces/records disc signals (for example, CD signals, DVD signals), and a gyro 324. The mobile communication unit 315 and the GPS receiver 318 may receive signals via antennas 309 and 312, respectively.

A TV module 372 for TV signal reception may be connected to the main board 327 to receive a TV signal via TV antenna 275. The TV module 372 may also be connected to the display unit 300 controlled by the display control unit 333 via the interface board 306 and the front board 303 controlled by the key control unit 330.

The display unit 300 displays, for example, various video signals, map information, and character signals. The front board 303 may be provided with various function buttons and may provide a key signal corresponding to a user-selecting button to the main board 327. A menu button and a touch pad may be connected to the front board 303 for a user to select an operation mode according to an embodiment of the invention.

The audio board 342 may interface with the main board 327 and may include a microcomputer 354, a tuner 351 for radio signal reception, a power unit 345 that supplies power, and a signal processor unit 348 that performs signal processing for outputting various audio or voice signals.

The audio board 342 may be connected to a radio antenna 357 that receives radio signals, a tape deck 360 that plays back an audiotape, and an amplifier 369 that outputs the signal-processed audio signals and may also be connected to the interface board 306.

The vehicle interface 363, which transmits/receives signals to/from the amplifier 369 loaded on the moving subject, may include a hands-free/airbag/speed-sensor 366 and may receive/transmit signals from/to the audio board 342 and the main board 327. The vehicle interface 363 may be connected to a speed-sensor that detects vehicle speed, an airbag for passenger safety, and a hands-free device for hands-free input of voice signals. The speed-sensor may provide speed information to the central processor unit 326 to detect the speed of the vehicle being driven.

The above-described navigation system according to embodiments of the invention may be connected to various audio and video devices and may additionally be provided with a telematics function to perform various wireless data services. Hence, the navigation system may function as a convergence system enabling mobile communications and broadcasting receptions, as well as the navigation function of the moving subject.

In doing so, the mobile communication unit 315 may communicate with a mobile communication network via the antenna 309 by wireless. The corresponding received signal may be transmitted to the audio board 342 under the control of the central processor unit 327 to be processed via the signal processor unit 348 of the audio board 342 and the processed signal may be then output to the amplifier 369 under the control of the microcomputer 354.

The TV signal received via the TV antenna 375 may be signal-processed by the TV module 372. The signal-processed TV reception signal may be converted to a video signal to be displayed on the display unit 300 via the interface board 306 under the control of the control unit 333. The audio signal of the TV reception signal may be output via the audio board 342 and the amplifier 369.

Moreover, the audio output of the radio signal via the tuner 351 and the audio output of the audio tape may be output via the audio board 342 and the amplifier 369. The audio signal played back through the CD deck 321 may be output via the amplifier 369. Various video signals may be displayed on the display unit 300.

Operational modes according to functions of the navigation system according to embodiments of the invention may be mainly divided into a video mode and an audio mode. The video mode may include a navigation function for displaying a still picture and a TV reception/DVD playback function for displaying moving pictures. The audio mode may include a radio reception function for FM/AM broadcast signal reception and a CD/MP3/tape playback function of reproducing audio signals only. The navigation function may display a still picture or image, such as a map or a direction key, for informing a user of the state of the driven vehicle.

Figure 3:
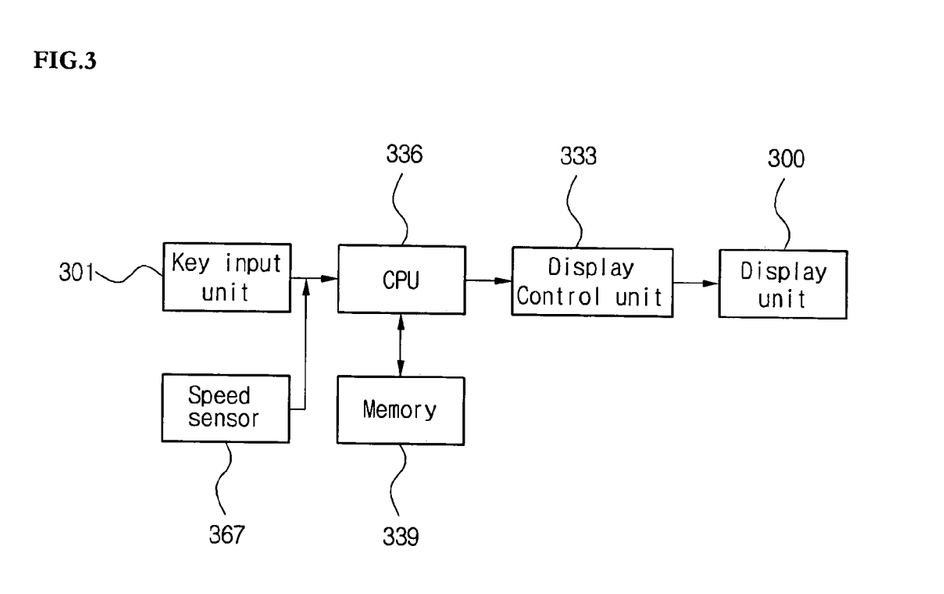
FIG. 3 is a block diagram of an operational mode controller of a navigation system according to an embodiment of the invention.

FIG. 3 is a block diagram of an operational mode controller of a navigation system according to an embodiment of the invention. Referring to FIG. 3, a key input unit 301, such as a keypad or touch screen, may be provided on the front board. The key input unit 301 may include a TV button, a DVD button, a CD button, a tape button, an AM/PM button, and/or a navigation button. If a user selects a specific function button, the key input unit 301 delivers a signal of the corresponding mode to the central processor unit 336.

The speed sensor 367 may detect a moving or traveling speed of a moving subject, such as a vehicle, and then deliver the detected speed to the central processor unit 336. The memory 339 may store a communication mode, a video mode, an audio mode, and a peripheral illumination intensity adjustment mode, by priority according to a traveling or stop state of the moving subject. Namely, in the traveling state, the control priority follows the sequence of the communication (navigation), audio, video, and peripheral illumination intensity adjustment modes. In the stop state, the control priority follows the sequence of the communication (navigation), video, audio, and peripheral illumination intensity adjustment modes.

Figure 4:
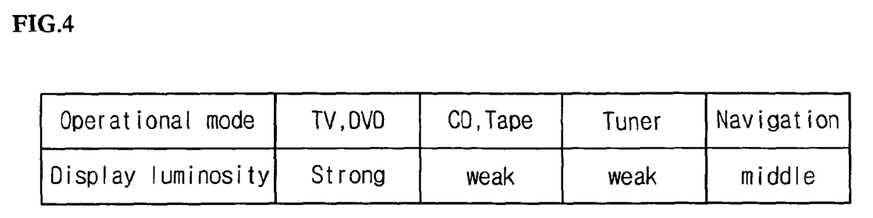
FIG. 4 is a table of display illumination per operation mode in a navigation system according to an embodiment of the invention.

The memory 339 may also store at least two detailed levels per mode of the function button. For instance, display illumination levels (strong, middle, weak) according to operational modes, as shown in FIG. 4, may be stored in the memory 339, respectively. Referring to FIG. 4, in the case of a video mode, such as a TV/DVD mode for playing moving pictures, a display illumination level is set to 'strong'. In the case of an audio mode, such as a CD/Tape function and a tuner, the display illumination level is set to 'weak'. In case of a navigation mode, such as a still picture, the display illumination level is set to 'middle' or 'moderate'.

Figure 5:
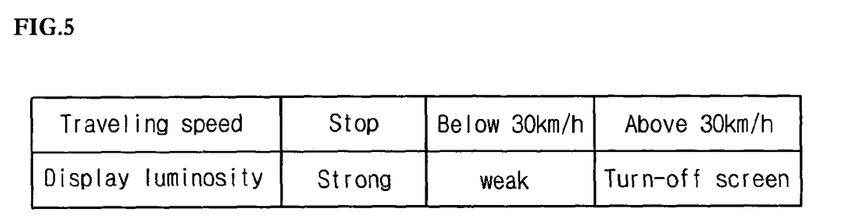
FIG. 5 is a table of display illumination according to a traveling speed of a moving subject according to an embodiment of the invention.

The memory 339 may store at least two detailed modes of the display illumination level according to the traveling speed. For instance, in FIG. 5, if the traveling speed is '0' in a stop state, the display illumination is set to 'strong.' If the traveling speed fails to exceed a prescribed speed, for example 30 km/h, the display illumination is set to 'weak' so as not to interfere with user's driving. If the traveling speed exceeds the prescribed speed, it is set up to turn off the display power since the display illumination interferes with the user's driving. In doing so, the prescribed speed, which is sensed different for each user's sensibility, is adjustable within a range of device limit.

The central processor unit 336 may decide a current speed if a specific function button is selected and then perform its control by operational mode priority according to traveling or stopping. Once the operation mode is confirmed according to the signal input from the key input unit 301, the central processor unit 336 reads the display illumination level according to the corresponding operational mode from the memory 339 and then sends a control signal to the display control unit 333. The display control unit 333 correspondingly outputs a backlight control voltage value to the display unit 300 to control the display illumination.

Moreover, while the specific function button is operating, the central processor unit 336 may compute a speed based on a traveling distance per second detected from the speed sensor 367 and then read the display illumination level corresponding to a current traveling speed. In doing so, in the case of the stop state (V=0), the display illumination level is set strong. If the current traveling speed is equal to or lower than the prescribed speed, the display illumination level is set weak. If the current traveling speed exceeds the prescribed speed, the display power is turned off. Namely, if the traveling speed exceeds the prescribed speed, for example, 30 km/h, the display interferes with driver's visibility. Hence, the display power is turned off to prevent a traffic accident. Besides, a video play mode during driving may be prohibited by law.

Figure 6:
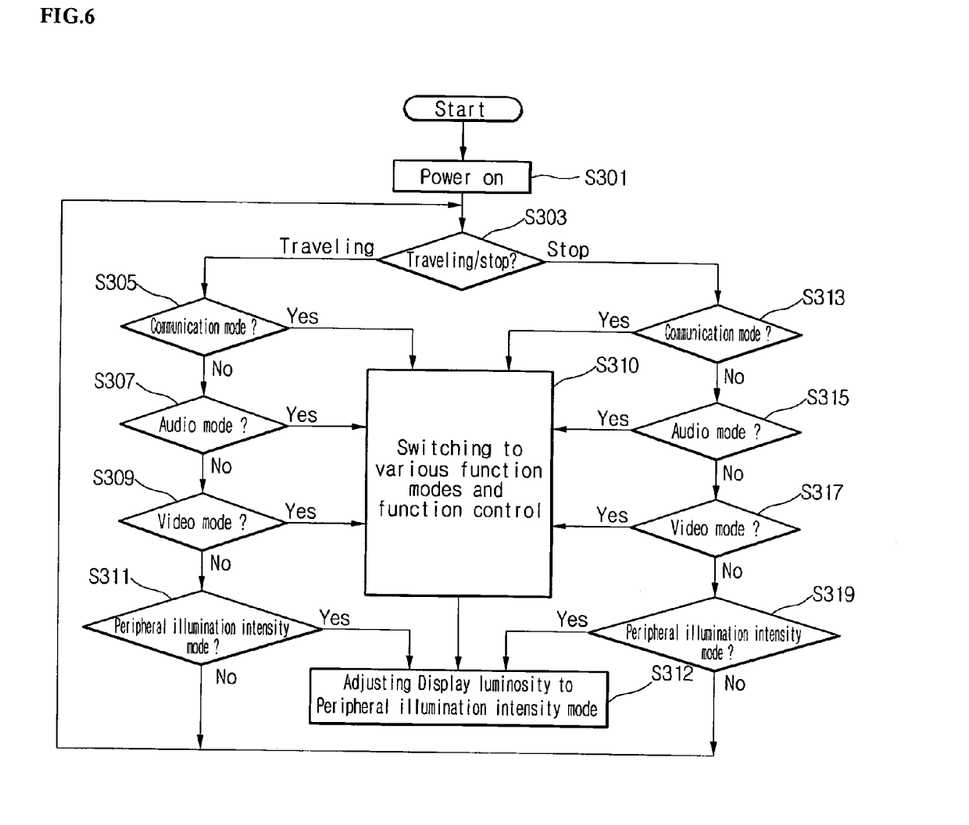
FIG. 6 is a flowchart of a method of controlling an operational mode in a navigation system according to an embodiment of the invention.

FIG. 6 is a flowchart of a method of controlling an operational mode in a navigation system according to an embodiment of the invention. Referring to FIG. 6, once a system power is turned on, a traveling or stop state of a moving subject is checked, in step S301. If the moving subject is in a traveling state, operational states are checked according to a communication mode, in step S305, an audio mode, in step S307, a video mode, in step S309, and a peripheral illumination intensity mode, in step S311 according to a predefined control priority.

If a specific function mode is selected, the priority per traveling state is checked, the operation is switched to the selected function mode, and the corresponding function is controlled, in step S310. While the moving subject is in the traveling state, the operation is switched to the communication mode prior to other modes, if the communication mode is selected. Further, the operation is switched to the audio mode prior to the video or peripheral illumination intensity mode, if the audio mode is selected. Also, the operation is switched to the video mode prior to the peripheral illumination intensity mode, if the video mode is selected. Once the specific mode is executed, the peripheral illumination intensity mode is automatically performed to automatically adjust the display luminosity to the peripheral illumination intensity mode, in step S312.

If the moving subject is in the stop state, operational states are checked according to a communication mode, in step S313, a video mode, in step S315, an audio mode, in step S317, and a peripheral illumination intensity mode, in step S319 according to a predefined control priority. As a result of the check, if a specific function mode is selected, an operation is switched to the corresponding function mode according to the control priority of the stop state to control the corresponding function.

While the moving subject is in the stop state, the operation is switched to the communication mode prior to other modes, if the communication mode is selected. Further, the operation is switched to the video mode prior to the audio or peripheral illumination intensity mode, if the video mode is selected. Also, the operation is switched to the audio mode prior to the peripheral illumination intensity mode, if the audio mode is selected. Once the specific mode is executed, the peripheral illumination intensity mode is automatically performed to automatically adjust the display luminosity to the peripheral illumination intensity mode, in step S312.

In doing so, the luminosity adjustment mode by the peripheral illumination intensity mode can be entered via the communication, audio, or video mode. The display luminosity adjustment per mode is enabled through the peripheral illumination intensity mode. Moreover, the navigation mode is the communication mode having the highest priority.

Figure 7:
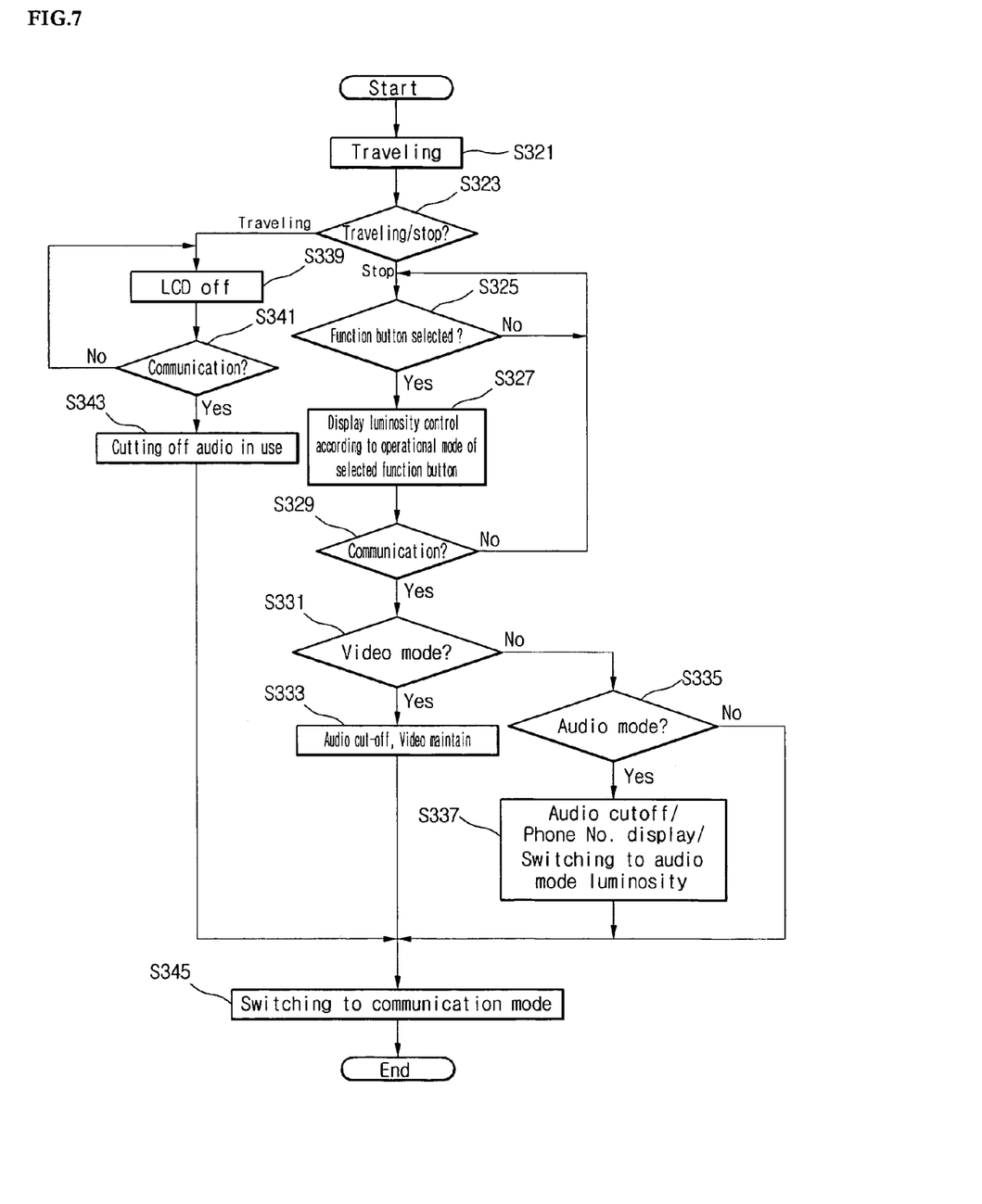
FIG. 7 is a flowchart of a method of controlling an operational mode according to presence or non-presence of communications of a navigation system according to an embodiment of the invention.

FIG. 7 is a flowchart of a method of controlling an operational mode according to the presence or non-presence of communications of a navigation system according to an embodiment of the invention. Referring to FIG. 7, after a moving subject has started traveling, in step S321, a traveling or stop state is checked, in step S323. If the moving subject is in the stop state, a presence or non-presence of a function button selection is checked, in step S325. If a function button is selected, display luminosity according to an operation mode of the selected function button is controlled, in step S327.

Thereafter, while a specific operational mode is operating, it is checked whether it is a communication mode according to phone transmission/reception, in step S329. If it is the communication mode, it is checked whether a current operational mode is a video mode, in step S331.

As a result of the check, if it is the video mode, an audio output which is currently output to a speaker is cut off, a video of the display unit is maintained, in step S333, and it is switched to the communication mode, in step S345.

As a result of the check, if it is not the video mode but the audio mode, in step S335, an audio output which is currently output to a speaker is cut off, a calling party's phone number is displayed, the display luminosity is switched to that of the audio mode, in step S337, and it is then switched to the communication mode, in step S345.

Meanwhile, if the moving subject is in the traveling state, the display power is turned off in case that a current traveling speed exceeds a prescribed speed, in step S341. It is then checked whether it is the communication mode or not, in step S341. In the case of the communication mode, an audio output which is output from, for example, a currently used AM/FM radio, CD, and tape is cut off, in step S343. It is then switched to the communication mode, in step S345.

Figure 8:
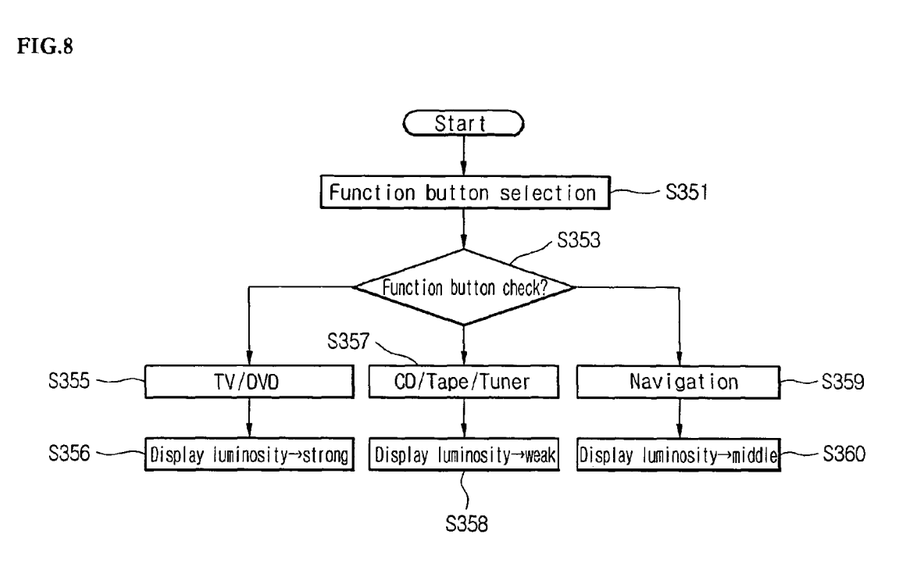
FIG. 8 is a flowchart of a method of controlling display illumination according to an operational mode in a navigation system according to an embodiment of the invention.

FIG. 8 is a flowchart of a method of controlling display illumination automatically according to an operational mode in a navigation system according to an embodiment of the invention. Referring to FIG. 8, once a function button is selected, in step S351, the selected function button is checked, in step S353. If the selected operational mode is a moving picture play mode of, for example, TV and DVD in step S355, the display illumination is automatically adjusted to a strong level, in step S356. If the selected operational mode is an audio mode of, for example, CD, tape, and tuner, the display illumination is automatically adjusted to a weak level, in steps S357, S358. If the selected operational mode is a navigation mode, the display illumination is automatically adjusted to a middle or moderate level, in steps S359, S360.

In other words, if the moving subject is in the stop state, automatic adjustment is executed according to the display illumination level set up in the memory. Namely, it is controlled to a highest luminosity level for the moving picture mode of, for example, TV and DVD, to a lowest luminosity level for the audio mode of, for example, CD, tape, and tuner, or to a middle or moderate luminosity level for the navigation mode that is a still picture mode. In proceeding to the communication mode while maintaining the above state, an audio output of the function mode that is output to a speaker is cut off only and it is switched to the communication mode.

Figure 9:
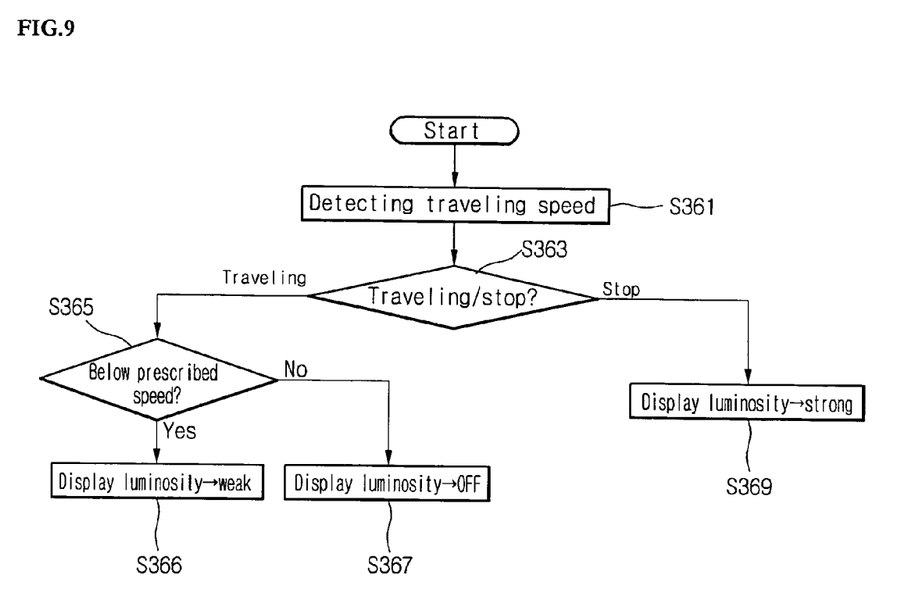
FIG. 9 is a flowchart of a method of controlling display illumination according to a traveling speed in a navigation system according to an embodiment of the invention.

FIG. 9 is a flowchart of a method of controlling display illumination according to a traveling speed in a navigation system according to an embodiment of the invention. Referring to FIG. 9, a traveling speed of a moving subject is detected, in step S361, to check a traveling or stop state, in step S363. If the moving subject is in the traveling state, it is checked whether a traveling speed exceeds a prescribed speed or not, in step S365. If the traveling speed fails to exceed the prescribed speed, the display luminosity is automatically adjusted to a weak level, in step S366. If the traveling speed exceeds the prescribed speed, the display power is turned off, in step S367.

Meanwhile, if the moving subject is in the stop state, the display luminosity is automatically adjusted to a strong level, in step S369. Namely, even if the current operational mode is operating to play back a moving or still picture, it is able to adjust the display luminosity to one of the strong, middle, and turn-off states according to the traveling speed of the moving subject.

The apparatus and method for controlling display luminosity according to an operational mode in a navigation system according to embodiments of the invention provide at least the following advantages.

In the apparatus and method for controlling an operational mode in a navigation system according to embodiments of the invention, a priority per function mode is set up according to a traveling state and the function mode is handled according to the setup priority for the corresponding traveling state. Further, in the apparatus and method for controlling an operational mode in a navigation system according to embodiments of the invention, a display illumination level can be automatically controlled for a function mode operating according to a display illumination traveling state. Also, in the apparatus and method for controlling an operational mode in a navigation system according to embodiments of the invention, a specific function for a traveling speed or a functional operation mode is automatically restricted and display illumination can be automatically controlled to fit the corresponding functional operation mode.

Hence, embodiments of the invention provide automatic luminosity control per traveling speed and automatic luminosity; control per operational mode. Further, embodiments of the invention provide automatic control of display luminosity and audio output to fit the control priority of the operational mode according to the traveling or stop state.

As mentioned in the foregoing description, the operational mode control apparatus and method of a navigation system according to embodiments of the invention puts limitations on the operation mode of the navigation system provided with various functions. Each of the operational modes differs in control priority according to the traveling speed and automatically controls the display luminosity or illumination according to the operational environment or operational mode, thereby providing a convenient environment to a vehicle driver and preventing accidents. Moreover, if the communication mode and/or the navigation mode are initiated in spite of the operation in a specific function mode, embodiments according to the invention enable the initiated mode to operate prior to other modes.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of controlling display luminosity according to an operational mode in a navigation system, comprising:
   determining whether a specific function button is selected from a plurality of function buttons, the plurality of function buttons corresponding to a respective plurality of operational modes of the navigation system, said plurality of operational modes including at least two of a communication mode, an audio mode, a video mode, or a peripheral illumination intensity adjustment mode;
   detecting a speed of a subject of the navigation system; and
   automatically adjusting a display luminosity based on the operational mode that corresponds to the selected button and the detected speed, the display luminosity adjusted to a first luminosity for a first one of said plurality of operational modes and to a second luminosity different from the first luminosity for a second one of said plurality of operational modes, the operational mode corresponding to the selected button being one of the first or second operational modes.

2. The method of claim 1, further comprising:
   checking whether the subject is in a traveling or a stop state, and
   controlling the display luminosity based on whether the subject is in the traveling or stop state, wherein in the traveling state the audio mode has priority with respect to the display luminosity, and in the stop state the video mode has priority with respect to display luminosity.

3. The method of claim 2, wherein if the communication mode is initiated while the video or audio mode is activated, the communication mode has priority with respect to display luminosity.

4. The method of claim 3, wherein if the communication mode is initiated, an audio output of the audio or video mode is cut off.

5. The method of claim 3, wherein if the communication mode is initiated while the video mode is activated, a video output is maintained but an audio output is cut off.

6. The method of claim 2, wherein if the subject is in the traveling state, an operational priority is controlled in order of the communication mode, the audio mode, and the video mode with respect to display luminosity.

7. The method of claim 2, wherein if the subject is in the stop state, an operational priority is controlled in order of the communication mode, the video mode, and the audio mode with respect to display luminosity.

8. The method of claim 2, wherein if a communication mode is initiated while the subject is in a traveling or stop state, the communication mode is processed prior to the audio and video modes.

9. The method of claim 1, wherein the audio mode includes an audio output function due to a radio receiver, a compact disc, or a magnetic tape.

10. The method of claim 1, wherein the video mode includes a moving picture playback function for TV reception and DVD.

11. The method of claim 1, wherein if the operational mode is switched to the communication mode, a phone number is displayed on a display screen.

12. The method of claim 1, wherein if a traveling speed of the subject exceeds a prescribed speed, a display power is automatically turned off and the operational mode is automatically switched to an audio mode.

13. The method of claim 1, wherein in adjusting the display luminosity, the display luminosity is adjusted to a strong level in the video mode or to a weak level in the audio mode.

14. The method of claim 1, wherein the display comprises an LCD.

15. The method of claim 1, wherein the display comprises an LCD.

16. The method of claim 1, wherein:
   moving or still pictures generated based on a television signal or DVD signal are displayed on a screen of the navigation system in the video mode, and
   audio signals generated from a CD or tape or radio are output through speakers of the navigation system in the audio mode, the display luminosity being automatically adjusted based on whether the navigation system is in the video mode or the audio mode.

17. The method of claim 1, wherein the display luminosity is adjusted to a first luminosity for a first one activated of said plurality of operational modes and to a second luminosity different from the first luminosity for a second of said plurality of operational modes.

18. The method of claim 1, wherein said detecting is performed after said determining.

19. The method of claim 1, wherein the display luminosity of an entire area of a screen of the navigation system is automatically adjusted based on the operational mode that corresponds to the selected button and the detected speed.

20. A method of controlling display luminosity according to an operational mode in a navigation system, comprising:
   checking whether a subject is in a traveling state or a stop state;

automatically controlling a display luminosity based on whether the subject is in the traveling or stop state and according to an operational mode of a plurality of operational modes of the navigation system, said plurality of operational modes including at least two of a communication mode, an audio mode, a video mode, or a peripheral illumination intensity adjustment mode; and if the communication mode is initiated while the navigation system is in another one of the operational modes, switching the operational mode of the navigation system to the communication mode after cutting off an audio output of the video or audio mode.

21. The method of claim 20, further comprising turning off a display power if the subject is in the traveling state and cutting off audio output.

22. The method of claim 20, wherein if the current operational mode is the video mode when the communication mode is initiated, a video is maintained but an audio output is cut off, and wherein if the current operational mode is the audio mode when the communication mode is initiated, audio is cut off.

23. The method of claim 20, wherein when the communication mode is initiated a calling party phone number is displayed.

24. The method of claim 20, wherein in performing display luminosity control, the luminosity is controlled to a strong level if the operational mode is the video mode, to a weak level if the operation mode is the audio mode, or to a middle level if the operational mode is the communication mode.

25. The method of claim 24, wherein the audio mode includes an audio output function due to a radio receiver, a compact disc, or a magnetic tape.

26. The method of claim 24, wherein the video mode includes a moving picture playback function for TV reception or for a DVD.

27. The method of claim 24, wherein the communication mode includes a still picture function for navigation.

28. The method of claim 20, wherein if a traveling speed of the subject is equal to or lower than a prescribed speed, the display luminosity is adjusted to a weak level.

29. The method of claim 20, wherein the display luminosity of an entire area of a screen of the navigation system is automatically adjusted based on the operational mode and whether the subject is in the traveling or stop state.

30. A method of controlling display luminosity according to an operational mode in a navigation system, comprising:
setting up a different priority in each of a traveling and stop state of a subject for a plurality of operational modes of the system, said operational modes including at least two of a communication mode, an audio mode, a video mode, or a peripheral illumination intensity adjustment mode;
setting up a different display luminosity level for each of the operational modes according the traveling or stop state of the system;
detecting a traveling speed of a subject; and
controlling the operational mode of the navigation system based on a corresponding one of the different priorities and adjusting display luminosity to the display luminosity level of the corresponding operational mode based on the detected speed of the subject.

31. The method of claim 30, wherein if the subject is in the traveling state, the priority of operation is set up in order of the communication mode, the audio mode, and the video mode, and wherein if the moving subject is in the stop state, the priority of operation is set up in order of the communication mode, the video mode, and the audio mode.

32. The method of claim 30, wherein if the moving subject is in the stop state, the display luminosity level is adjusted to a strong level if the operational mode is the video mode, to a weak level if the operation mode is the audio mode, or to a middle level if the operational mode is the communication mode.

33. The method of claim 32, wherein the video mode includes a moving picture playback function for TV reception or for a DVD.

34. The method of claim 32, wherein the communication mode includes a still picture function for navigation.

35. The method of claim 32, wherein the audio mode includes an audio output function due to a radio receiver, a compact disc, or a magnetic tape.

36. The method of claim 30, wherein the display luminosity of an entire area of a screen of the navigation system is adjusted to the display luminosity level of the corresponding operational mode.

37. An apparatus for controlling a display luminosity according to an operational mode of a navigation system, comprising:
a key input unit including a plurality of function keys corresponding to a respective plurality of operational modes;
a memory configured to store predetermined display luminosity levels corresponding to the plurality of operational modes and/or states of a subject;
a central processing unit configured to receive a signal from the key input unit generated by selection a function key corresponding to one of the operational modes and to read a display luminosity level from the memory corresponding to the operational mode corresponding to the selected function key; and
a display control unit configured to a receive a control signal from the central processing unit and to control a backlight control value of a display unit to control display luminosity in accordance with the operational mode corresponding to the selected function key and a traveling state of a subject.

38. The apparatus of claim 37, further comprising:
a speed sensor configured to detect a speed of a subject,
wherein the display luminosity level is controlled in accordance with the speed of the subject in addition to the selected operational mode.

39. The apparatus of claim 38, wherein the display luminosity level is predetermined by a priority sequence according to the state of the subject ascertained from the detected speed.

40. The apparatus of claim 37, wherein the display control unit is configured to control the backlight control value to control display luminosity of an entire area of a screen of the navigation system in accordance with the operational mode corresponding to the selected function.

41. A method of controlling an information system, comprising:
determining an operational mode of the information system, the operational mode initiated by selection of one of a plurality of function buttons of the information system;
detecting a speed of a subject of the information system; and
automatically controlling luminosity of a screen coupled to the information system based on the operational mode initiated by selection of one of the function buttons and based on the speed of the subject, wherein the operational mode includes at least one of:

a video mode for displaying moving or still pictures generated from a television signal or a signal generated from information read from a recording medium storing a movie, or an audio mode for reproducing sound signals generated from a radio or a recording medium storing one or more music tracks, wherein a luminosity of the screen of the video mode is stronger than that of the audio mode.

42. The method of claim 41, wherein the information system includes or is coupled to a navigation system, and wherein the luminosity of the screen is controlled to have a different level from the luminosity levels of the screen when the information system is in the audio or the video mode.

43. The method of claim 41, wherein the luminosity of an entire area of the screen coupled to the information system is automatically controlled based on the operational mode initiated by selection of said one of the function buttons and based on the speed of the subject.

44. A method of controlling an information system, comprising:
   detecting selection of a function button corresponding to one of a plurality of operational modes of the information system;
   determining a traveling speed of a carrier of the information system; and
   automatically controlling luminosity of a screen coupled to the information system based on the selected function button and the traveling speed, wherein the traveling speed lies in a range that includes zero miles per hour to a speed different from zero miles per hour.

45. The method of claim 44, further comprising:
   wherein the operational modes include at least one of:
   a video mode for displaying moving or still pictures generated from a television signal or a signal generated from information read from a recording medium storing a movie, or
   an audio mode for reproducing sound signals generated from a radio or a recording medium storing one or more music tracks.

46. The method of claim 45, wherein the information system includes or is coupled to a navigation system, and wherein the luminosity of the screen is controlled to have a different level from the luminosity levels of the screen when the information system is in the audio or the video mode.

47. The method of claim 44, wherein the luminosity of the screen is set to a first level when the carrier is traveling at a first speed and is set to a second level when the carrier is traveling at a second speed different from the first speed.

48. The method of claim 47, wherein the second speed is greater than the first speed and wherein the screen is set to a non-zero predetermined level at the first speed and is turned off at the second speed.

49. The method of claim 48, wherein the first speed is a non-zero speed and wherein the screen is set to a third luminosity level when the speed is zero, the third luminosity level being higher than the first luminosity level.

50. The method of claim 44, wherein the luminosity of an entire area of the screen coupled to the information system is automatically controlled based on the selected function button and the traveling speed.

51. A method of controlling display luminosity according to an operational mode in a navigation system, comprising:
   determining whether a specific function button is selected from a plurality of function buttons, the plurality of function buttons corresponding to a respective plurality of operational modes of a navigation system, said plurality of operational modes including at least two of a communication mode, an audio mode, a video mode, or a peripheral illumination intensity adjustment mode; and
   automatically adjusting a display luminosity based on selection of one of said function buttons corresponding to one of said operational modes, the display luminosity adjusted to a first luminosity for a first one of said plurality of operational modes based on a selected mode and to a second luminosity based on a travelling speed of the navigation system.

52. The method of claim 51, wherein the display luminosity of an entire area of a screen of the display unit is automatically controlled based on selection of one of said function buttons corresponding to one of said operational modes.

* * * * *